No. 732,161. PATENTED JUNE 30, 1903.
H. J. BOEKEN.
MACHINE FOR DIVESTING PARTS OF PLANTS OF THEIR FLESHY SUBSTANCES.
APPLICATION FILED FEB. 4, 1902.
NO MODEL. 2 SHEETS—SHEET 1.

Witnesses:
F. G. Harder
Jos. Schnitzler

Inventor:
Hubert Joseph Boeken
per Martin Schmitz
Attorney.

No. 732,161. PATENTED JUNE 30, 1903.
H. J. BOEKEN.
MACHINE FOR DIVESTING PARTS OF PLANTS OF THEIR FLESHY SUBSTANCES.
APPLICATION FILED FEB. 4, 1902.
NO MODEL. 2 SHEETS—SHEET 2.

Witnesses:
F. G. Harder.
Jos. Schnitzler.

Inventor:
Hubert Joseph Boeken
per Martin Schmitz
Attorney.

No. 732,161. Patented June 30, 1903.

UNITED STATES PATENT OFFICE.

HUBERT JOSEPH BOEKEN, OF DÜREN, GERMANY.

MACHINE FOR DIVESTING PARTS OF PLANTS OF THEIR FLESHY SUBSTANCES.

SPECIFICATION forming part of Letters Patent No. 732,161, dated June 30, 1903.

Application filed February 4, 1902. Serial No. 92,523. (No model.)

*To all whom it may concern:*

Be it known that I, HUBERT JOSEPH BOEKEN, civil engineer, a subject of the King of Prussia, Emperor of Germany, residing at Düren, Rhineland, in the Kingdom of Prussia, Empire of Germany, have invented certain new and useful Improvements in Machines for Divesting Parts of Plants of Their Fleshy Substances; and I do hereby declare the following to be a full, clear, and exact description of the invention, such as will enable others skilled in the art to which it appertains to make and use the same.

My present invention relates to machines for divesting parts of plants of their fleshy substance, and particularly to a machine in which the fibers of any suitable parts of plants—as, for instance, the leaves of the agave species—are to be obtained in their entire length without any loss of fibers or of time caused by being hitherto compelled to remove the fleshy substance first at one end of such parts of plants and then turn them end for end in order to remove the remaining part of said fleshy substance. My present invention does away with all these drawbacks, as the removal of the fleshy substance and the thereby necessitated manipulations are executed automatically, so that the parts of plants will enter the machine at one end, be divested of their fleshy substance while passing through the machine, and finally the wholly-bared fibers be thrown out at the other end of the machine.

Figure 1:
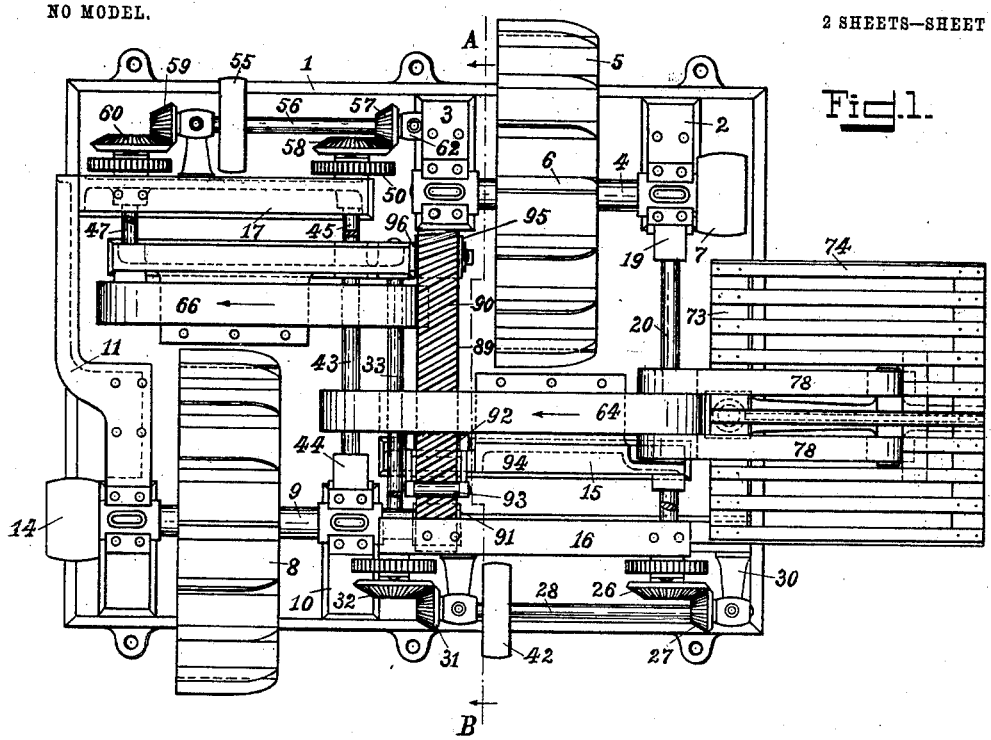
Figure 2:
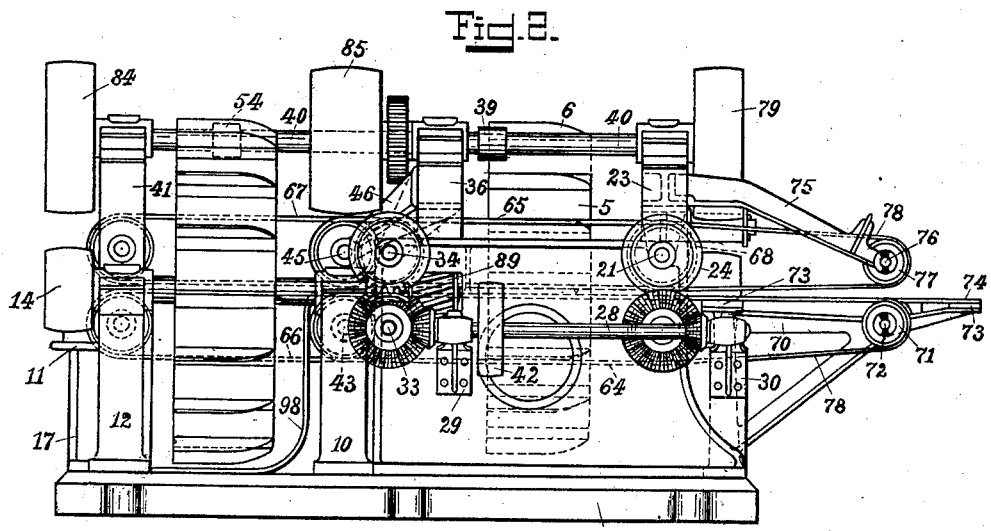
Figure 3:
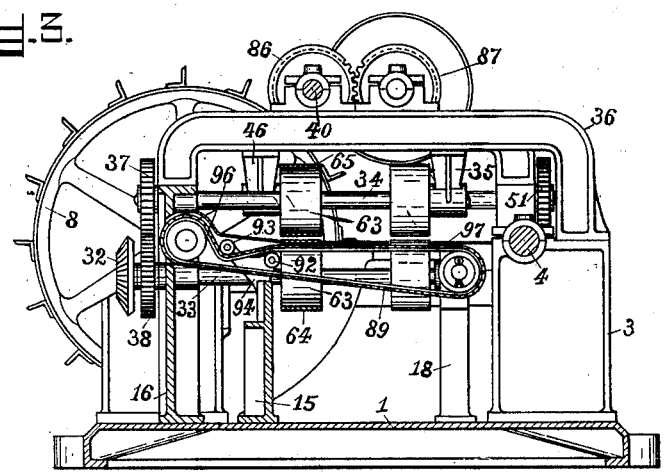
Figure 4:
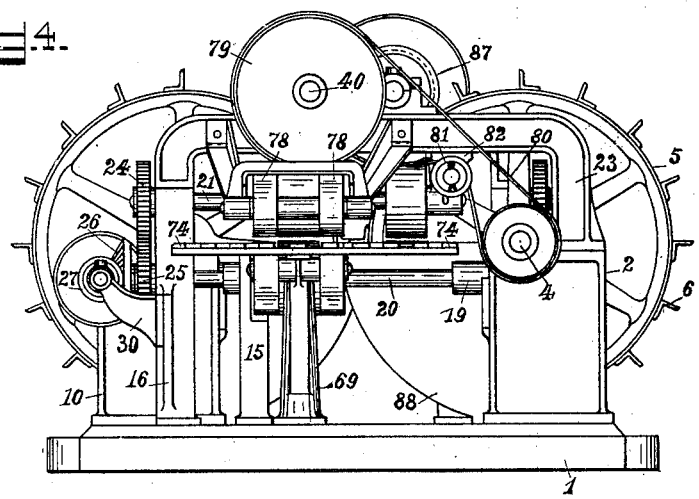
Figure 5:
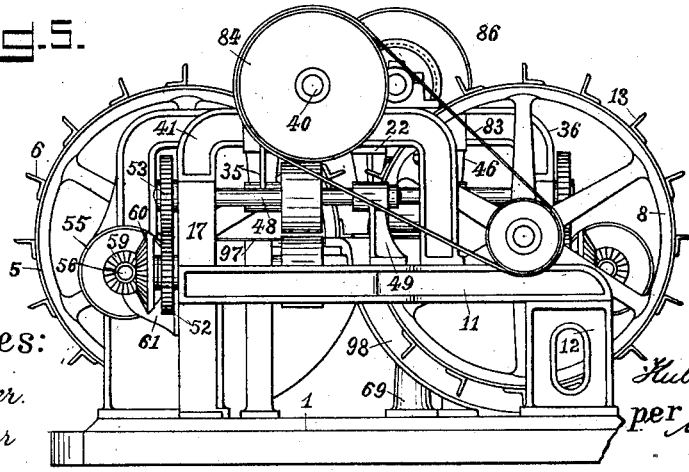

In the accompanying drawings, Figure 1 is a plan view of the machine, certain parts being removed. Fig. 2 is a side elevation of the machine. Fig. 3 is a transverse section on line A B of Fig. 1. Figs. 4 and 5 are two end views of the machine.

Upon the base 1 are secured the pedestals 2 and 3, carrying in their journal-boxes the shaft 4 of the rotary scutcher 5, provided on its circumference with knives 6 and receiving its motion from the driving-pulley 7. Diagonally to scutcher 5 is arranged a second scutcher 8, whose shaft 9 is resting, on the one hand, in the journal-box of the pedestal 10 and, on the other hand, in the journal-box of the frame 11, secured to the lower pedestal 12. This scutcher 8 is likewise provided with knives 13 and a driving-pulley 14, the same as scutcher 5. In front of the latter are secured to the base 1 the frames 15 and 16 and in front of the scutcher 8 the frames 17 and 18. In bearings of the frames 15 and 16 and in a bracket 19 on the pedestal 2 is journaled the shaft 20 and above it a shorter shaft 21, journaled at one end in the upper part of frame 16 and at the other end in a bracket 22, attached to the bridge-piece 23, secured to the flange of the frame 16 on one hand and to the pedestal 2 on the other hand. Both shafts 20 and 21 are connected by means of the wheels 24 and 25, the former on shaft 21 and the latter on shaft 20. In front of the wheel 25 is seated the bevel-wheel 26, meshing with the pinion 27, seated upon the shaft 28 in front of frame 16, to which it is held by means of the brackets 29 and 30. The end of shaft 28 next to scutcher 8 carries another pinion 31, meshing with the bevel-wheel 32, seated upon the shaft 33, which is partly journaled in the frame 16 and partly in the frame 18. Above this shaft 33 is journaled another shaft 34, similarly to shaft 21—*i. e.*, at one end in the upper part of the frame 16 and at the other end in a bracket 35, secured to bridge-piece 36, bolted to the flange of frame 16 and to the pedestal 3. The shafts 33 and 34 are connected by means of the wheels 37 and 38, respectively. Now all these four shafts 20 21 33 34 receive their motion from a pulley 39, seated upon the driving-shaft 40, journaled in the bridge-pieces 23 and 36 and in a third bridge-piece 41, secured to the frame 11 and to the flange of frame 17 by means of a belt (not shown) connecting the pulley 39 with the pulley 42 on shaft 28. In a similar manner the other horizontal shafts of the machine are arranged. Here the shaft 43 is journaled in the frames 17 and 18 and in the bracket 44 on the pedestal 10 and the shaft 45 in the upper part of the frame 17 and in a bracket 46 secured to the bridge-piece 36. The short shaft 47 is journaled in the frames 17 and 18 and the shaft 48 in the upper part of frame 17 and in a bracket 49, bolted to the frame 11. The shafts 43 and 45 are connected by means of the wheels 50 and 51 and the shafts 47 and 48 by means of the wheels 52 and 53, respectively. The last four-named shafts 43, 45, 47, and 48 receive their motion from the pulley 54 on driving-shaft 40, from whence the motion is transmitted by a belt (not shown) to the pulley 55 on the shaft 56, carrying the pinion 57, meshing with the bevel-wheel 58 on shaft 43, and the pinion 59, meshing with the bevel-wheel 60 on shaft 47. The shaft 56 is journaled in the bracket 61, bolted to the frame 17, and in the bracket 62, secured to the pedestal 3. All of the eight above-named shafts 20, 21, 33, 34, 43, 45, 47, and 48 are provided with a pulley 63, being in each instance of the same external diameter. Over these pulleys 63 the transport belts or bands 64, 65, 66, and 67 are running and are arranged in pairs, of which the belts 64 and 65 form the first and the belts 66 and 67 the second pair, which are arranged in such a manner that the belt 64 is connecting the shafts 20 and 43, the belt 65 the shafts 21 and 45, the belt 66 the shafts 33 and 47, and finally the belt 67 the shafts 34 and 48. It will be seen that the two pairs of belts 64 65 and 66 67 are arranged to pass each other, thus leaving a certain distance equal to the space between the centers of the shafts 33 43 and 34 45, respectively, for which the said pairs of belts overlap, the purpose of which will be explained farther on. Besides the pulleys 63 the shafts 20 and 21 are also provided with narrower pulleys 68, seated in each instance at both sides of the pulley 63. In front of the shaft 20 is placed a pillar 69, having a projecting braced arm 70, on which are journaled the idlers 71 on the shaft 72. On top of pillar 69, as well as upon the arm 70, are placed wooden cross-pieces 73, united by laths 74, forming a table upon which the parts of plants to be divested of their fleshy substance are placed. The bridge-piece 23 is provided with a frame 75, carrying at its end the shaft 76, upon which are seated the idlers 77, connected by the narrow feed-belts 78 with the corresponding pulleys 68 on shaft 21. In the same manner the idlers 71 are connected with the pulleys 68 on shaft 20.

The pulley 7 on shaft 4 receives its motion from the pulley 79 on driving-shaft 40 by means of a belt 80, held out of the way by an idler 81, carried by a bracket 82, secured to the bridge-piece 23, in order to give free admission to the parts of plants to be admitted to the machine. The scutcher 8 is driven by the open belt 83 from the pulley 84 on that part of the driving-shaft 40 carrying the principal driving-pulley 85. The driving-shaft 40 is composed of two parts connected with each other by the wheels 86 and 87 in order to give the two scutchers 5 and 8 the desired direction of motion.

If now some parts of plants are placed upon the lath-table, the feed-belts 78 will carry them between the transport-belts 64 and 65, which in turn will carry them toward the scutcher 5, whose knives 6 will remove the fleshy substance as soon as the parts of plants come between the knives 6 and the cast-iron casing 88, partly surrounding said scutcher 5. That part of the fibers coming in contact with the scutcher 5 will be wholly divested of its fleshy substance before the bared fibers reach the off side of said scutcher and will limply hang down from the transport-belt 64, and it would be utterly impossible to feed them thus between the transport-belts 66 and 67, by which the bared fiber ends must be taken hold of to remove the remaining parts of the fleshy substance. To effect this automatically, an extra conveying-belt 89 has been provided and furnished on its surface with diagonally-arranged ribs or projections 90. This conveying-belt 89 runs at right angles to the two sets of transport-belts 64 65 and 66 67 and receives its motion from the pulley 91 on shaft 9 of scutcher 8 and is held in the proper position by the idlers 92 and 93, carried by a bracket 94, secured to the frame 15, while its other end is running over an idler 95, held in position by the bracket 96, bolted to the frame 18. This conveying-belt and the means by which it is operated are covered by a cover-plate 96, forming a smooth surface over which the ends of the parts of plants slide, projecting beyond the belts 64 and 65. A similar cover-plate 97 is arranged next to the transport-belt 66 for a similar purpose. As soon as the diagonal ribs 90 advance beyond the transport-belt 64 the limp fibers will be taken up one by one by said ribs and straightened out to their full length as the fleshy parts of plants are still held by the transport-belts 64 and 65. As the latter are steadily advancing and the upper side of the conveying-belt 89 enters between the transport-belts 66 67 as far as possible, the bared fiber ends will be introduced between the belts 66 67 and firmly taken hold of by them before the belts 64 65 give free the still fleshy portions of the parts of plants. The remaining part of the fleshy substance will be gradually removed by the knives 13 of scutcher 8 as soon as said fleshy parts of plants get between said knives and the curved plate 98 and will be thrown out of the machine in front of the frame 11 fully divested of all fleshy substance.

It will thus be seen that this machine will take hold of the parts of plants whose fibers are desired, divest them automatically of all fleshy parts, and throw out the bared fibers without the smallest loss of material and time and perform the changing of the grip on the fleshy parts to the bared fiber ends without any aid from outside by means of a conveying-belt running at right angles to the two sets of transport-belts.

I claim—

1. In a machine for divesting parts of plants of their fleshy substance, the combination of two pairs of transport-belts arranged to have both belts of the one pair overlap the adjacent ends of both belts of the other pair, a conveying-belt provided with diagonally-arranged ribs or projections and running at right angles to said two pairs of transport-belts, means to drive said conveying-belt, and means for guiding the conveying-belt through the lower belt of the first pair of transport-belts and in very close proximity to and past the adjacent end of the lower belt of the second pair of transport-belts.

2. In a machine for divesting parts of plants of their fleshy substance, the combination of two pairs of transport-belts suitably overlapping each other to allow one pair of said transport-belts to retain its grip upon the still fleshy ends of the parts of plants until the other pair of transport-belts has taken hold of the bared fibers, a conveying-belt running at right angles to said transport-belts and provided with ribs or projections diagonally arranged upon its outer surface to pick up the limp fibers hanging down from the first pair of transport-belts to straighten the fibers out and feed them practically parallel to each other between the second pair of transport-belts, means for imparting motion to said conveying-belt, and means for guiding said conveying-belt to have its upper surface pass in close proximity to the under side of the upper portion of the lower belt of the first pair of transport-belts, and to have the inner edges of the conveying-belt pass in very close proximity to the adjacent flexed portion of the lower belt of the second pair of transport-belts.

In testimony that I claim the foregoing as my invention I have signed my name in presence of two subscribing witnesses.

HUBERT JOSEPH BOEKEN.

Witnesses:
HENRY QUADFLIEG,
JOHN B. ADAMS.